United States Patent [19]

Perkins et al.

[11] Patent Number: 4,762,344
[45] Date of Patent: Aug. 9, 1988

[54] WELL CASING CONNECTION

[75] Inventors: Lee E. Perkins, 159 St. George Rd., Schriever, La. 70295; James J. Petrella, Houma, La.

[73] Assignee: Lee E. Perkins, Schriever, La.

[21] Appl. No.: 15,499

[22] Filed: Feb. 6, 1987

Related U.S. Application Data

[63] Continuation of Ser. No. 696,425, Jan. 30, 1985, abandoned.

[51] Int. Cl.⁴ .................................. F16L 55/00
[52] U.S. Cl. .................... 285/175; 285/332.3; 285/333; 285/334.4
[58] Field of Search ............. 285/92, 175, 332.3, 285/332.4, 333, 334, 334.4, 355, 390

[56] References Cited

U.S. PATENT DOCUMENTS

| | | | |
|---|---|---|---|
| 1,583,126 | 5/1926 | Crane | 285/175 |
| 1,588,128 | 6/1926 | Montgomery | |
| 2,239,942 | 4/1941 | Stone et al. | 285/334 |
| 2,258,066 | 10/1941 | Oyen | 285/334.4 |
| 2,574,081 | 11/1951 | Abegg | 285/334 |
| 2,783,809 | 3/1957 | Haines | 285/330 |
| 3,854,760 | 12/1974 | Duret | 285/381 |
| 4,310,181 | 1/1982 | Welsh et al. | 285/175 X |
| 4,373,750 | 2/1983 | Mantelle et al. | 285/334 |
| 4,397,484 | 8/1983 | Miller | 285/333 |
| 4,438,953 | 3/1984 | Timme, Jr. | 285/333 |
| 4,479,666 | 10/1984 | Welsh et al. | 285/175 X |
| 4,487,433 | 12/1984 | Miller | 285/333 |
| 4,494,777 | 1/1985 | Duret | 285/334 |
| 4,603,889 | 8/1986 | Welsh | 285/175 |

Primary Examiner—Randolph A. Reese
Assistant Examiner—Anthony Knight
Attorney, Agent, or Firm—Fleit, Jacobson, Cohn & Price

[57] ABSTRACT

A well pipe connection wherein the ends of the pipes have complementary sealing surfaces and are joined together by means of an internally threaded tubular connector that engages with corresponding threads on each of the pipe ends. One of the pipe ends has threads of a pitch that is greater than the pitch of the threads on the other pipe end, and the connector threads have corresponding thread pitches. The disclosed arrangement permits the connection to be assembled to the point short of relative sliding movement between the complementary sealing surfaces on the pipe ends and final tightening is accomplished by restraining the respective pipes from relative rotation while rotating the connector to draw the two pipe ends together into compressive sealing engagement without relative sliding in order to prevent galling of the sealing surfaces.

5 Claims, 6 Drawing Sheets

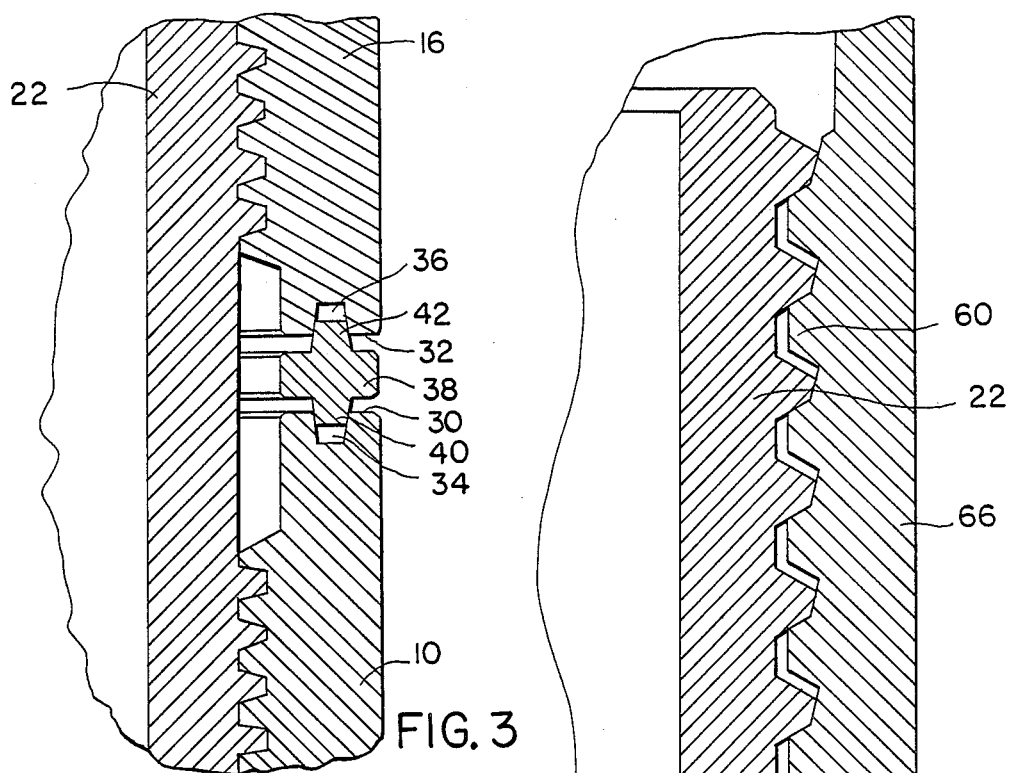
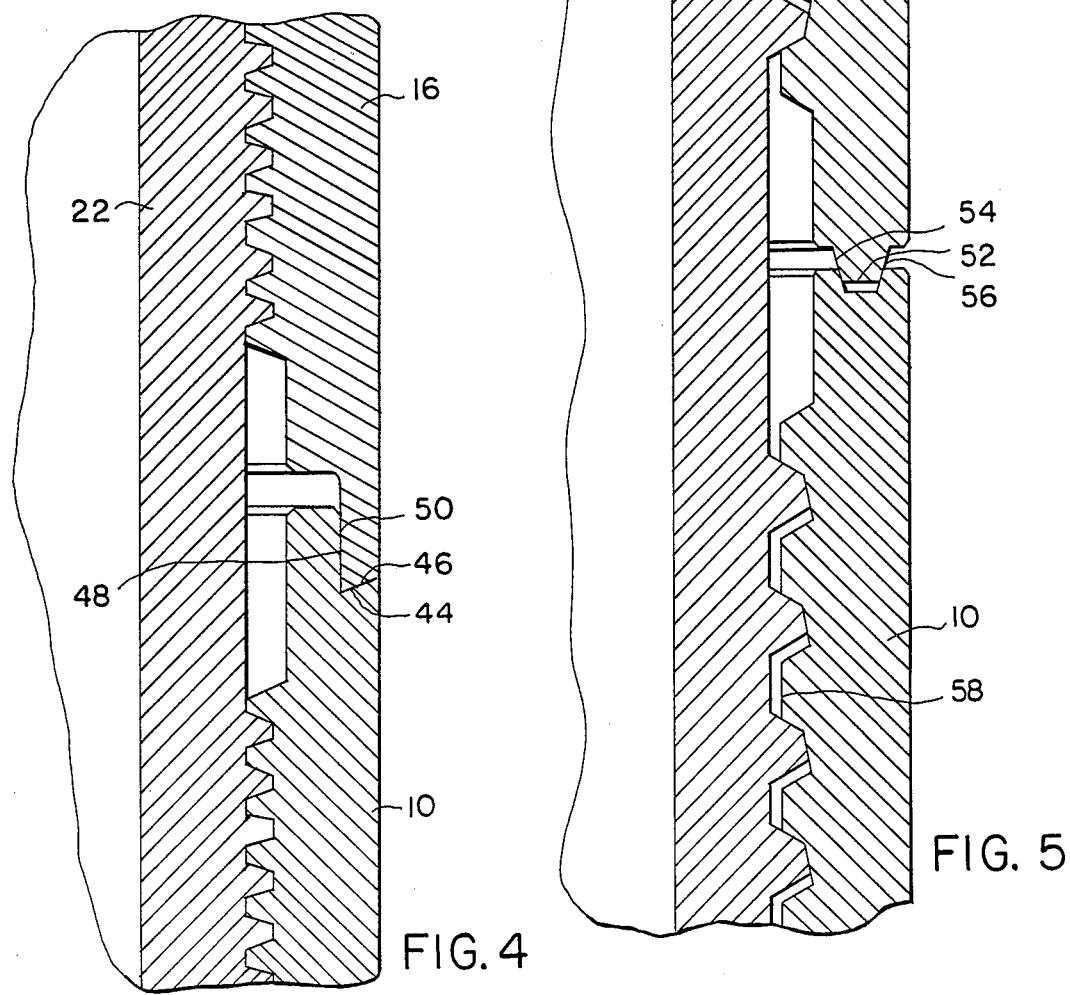

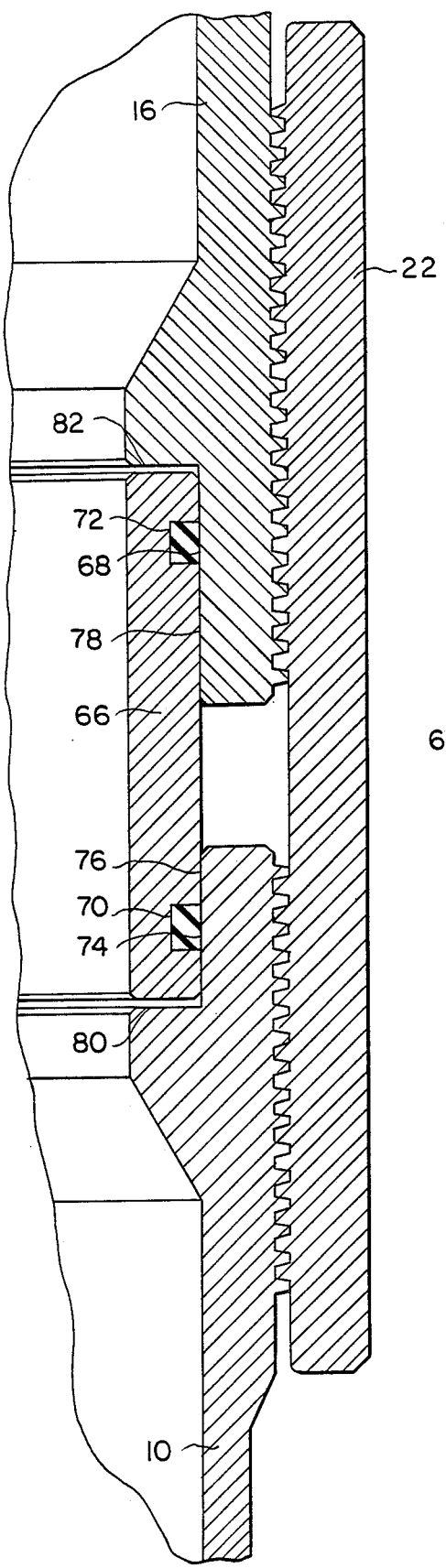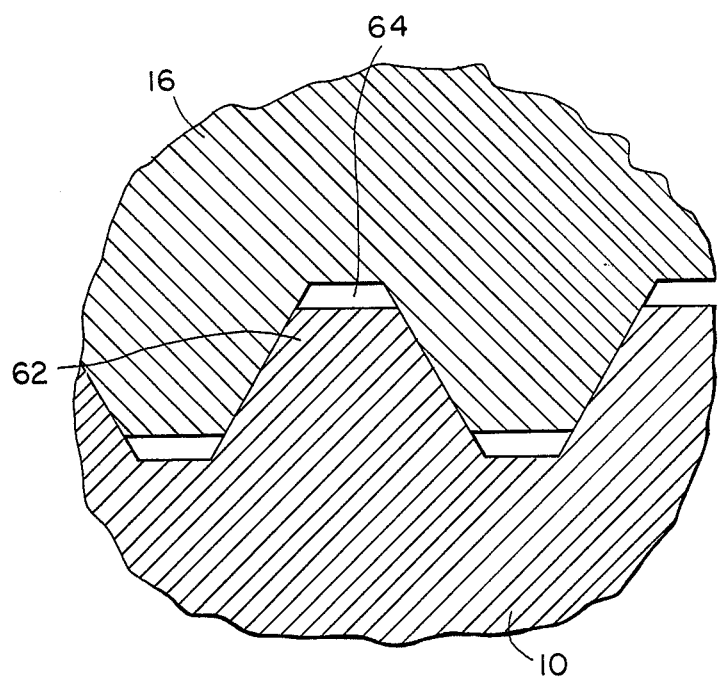
FIG. 6
FIG. 7

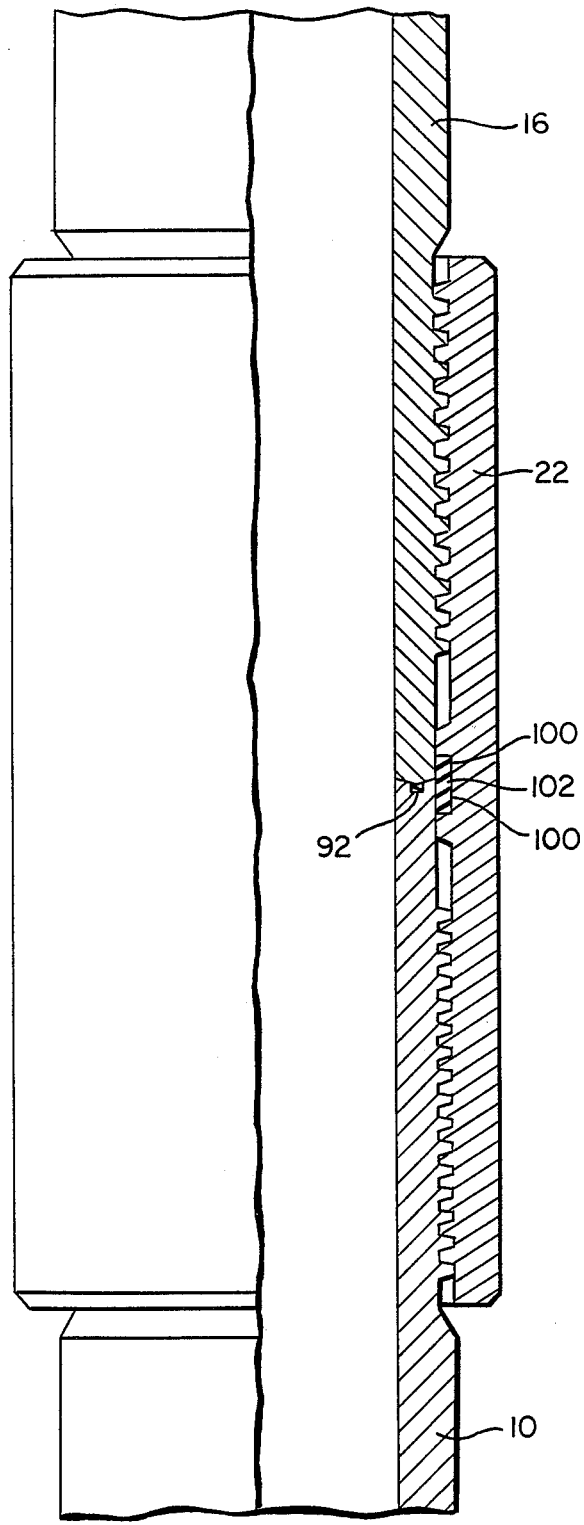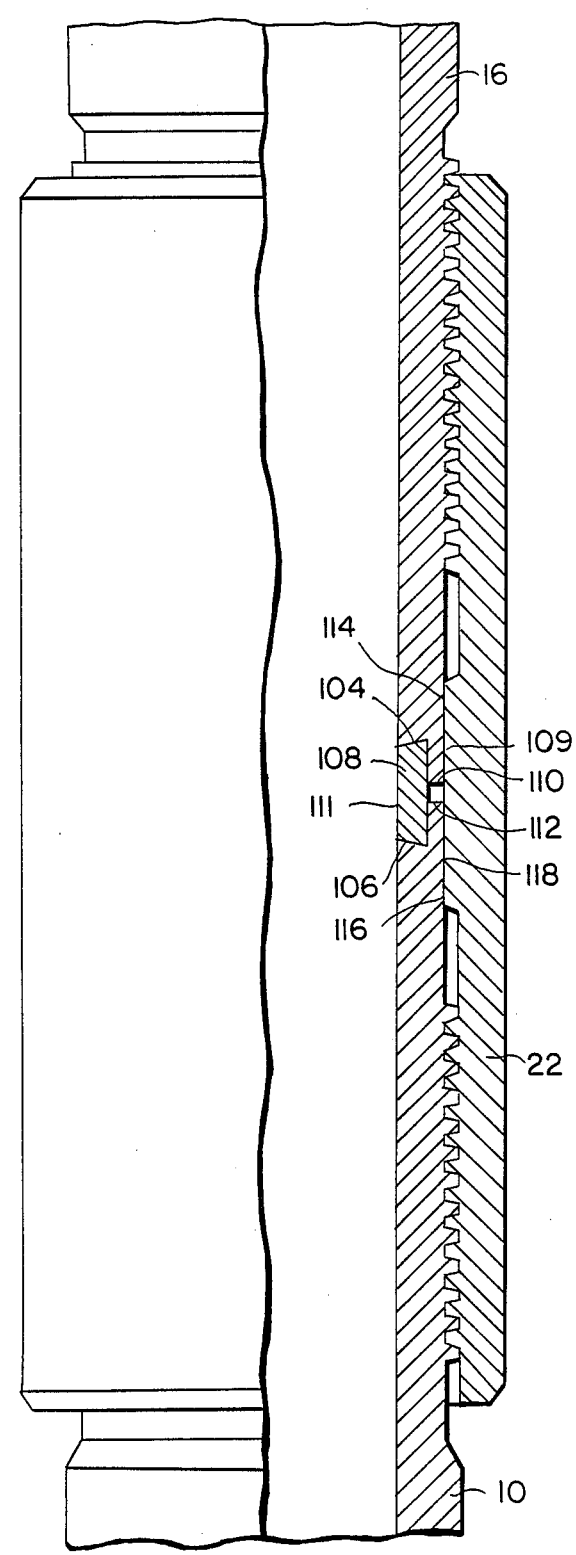

WELL CASING CONNECTION

This application is a continuation of application Ser. No. 696,425, filed Jan. 30, 1985, now abandoned.

BACKGROUND OF THE INVENTION

1. Field of the Invention

This invention relates to threaded connections for elongated pieces of pipe normally subjected to high fluid pressures, such as oil and gas well pipe, especially well casing, and more particularly to a well casing connection or coupling having improved strength and leak tightness and in which the sealing surfaces are brought into pressure contact without relative rotating movement therebetween.

2. Background of the Prior Art

In oil and gas well drilling operations it is common practice to provide metal casing in the form of a number of steel pipe sections connected by threaded connections which are ordinarily screwed together at the rig floor during what is referred to in the art as the "stabbing" and "make-up" procedure. The casing serves to define the bore hole, and thereby prevents the surrounding earth from entering the hole and also prevents the well products from escaping into the surrounding earth strata. Additionally, the casing serves to contain the drilling fluids and other compounds often used in the bore hole to cool or lubricate the drill and thereby speed up the drilling operation, and it also serves to facilitate the removal of the drilling fluids and compounds, and also of the oil or gas when the drilling operation is completed.

The casing includes a plurality of interconnected pipes or "joints," the connections generally being effected by threaded couplings that engage with corresponding threads on the ends of the adjacent casing sections. The resulting assembled casing is often called a string, and it extends from the floor of the drilling platform or rig down to the bottom of the well hole. When the casing is made up at the rig floor, one joint or section of pipe is already partially in the bore hole with an internally threaded female end of a connector extending slightly above the rig floor. The next joint or section of pipe, which has an externally threaded male end, is elevated and held vertically in a derrick with the lowermost end above the female end of the adjacent pipe. The uppermost joint of pipe is then lowered with the male end directed into the female end so that the threads can be engaged, or, as it is often expressed in the art, the uppermost joint is "stabbed" into the lowermost joint.

Because the "strings" of pipe are of substantial length, the connections must be sufficiently strong to withstand the bending loads imposed thereon, while at the same time providing a fluid-tight connection. The connections must also be capable of withstanding high tensile and compressive loads, the tensile loads being reflected principally in the uppermost connections of the casing, and caused by the weight of the lower portions of the casing, which act upon the connections above them and spaced along the vertical extent of the casing. Additionally, if an obstruction is encountered as the drilling operation proceeds, the connections are often subjected to compressive loads that are imposed on the casing from above in order to assist the drill and casing to penetrate and pass through the obstruction.

Over the course of the years a number of different types of thread and connector arrangements have been developed for oil well casing connections. For example, an arrangement utilizing cooperating tapered, threaded surfaces is disclosed in U.S. Pat. No. 3,854,760, which was granted on Dec. 17, 1974, to Jean Duret, in which a thread having an asymmetrical cross section and rounded edges is disclosed, and wherein the respective ends of the adjacent pipes are similarly configured for close engagement along cooperating and interengaging inclined surfaces formed on the respective ends thereof.

In U.S. Pat. No. 2,783,809, granted on Mar. 5, 1957, to M. W. Haines, a pipe union is shown and described including a tubular coupling connector and pipe ends having interengaging, tapered sealing surfaces. The tubular connector has a coarse, Acme-type thread formed on the interior thereof, with opposite faces of the thread cut to different leads. The pipe ends have external threads of the same hand and with leads that respectively correspond with those of the opposite faces of the internal threads on the inside of the connector with which they are adapted to be engaged. In operation, when turned, the connector serves to exert compression forces at the previously coupled sealing surfaces of the pipe ends.

Although a number of thread and connector configurations for oil field pipe have been developed over the course of the years, the use of available pipe-end-to-pipe-end sealing arrangements has not always provided a strong and fluid-tight seal under all the various conditions to which the connections are subjected in use. Additionally, in order to provide a fluid-tight joint, it is necessary to apply a high torque to one section of the pipe while holding the other section stationary in order to cause firm engagement between the respective sealing surfaces of the two joints. However, the rotation of one sealing surface relative to and against the other sealing surface while high compression forces are being applied to the surfaces frequently causes those surfaces to gall, or to wear away by the rubbing together of the sealing surfaces, thereby reducing the effectiveness of the seal therebetween.

SUMMARY OF THE INVENTION

It is an object of the present invention to overcome the deficiencies of the prior art oil field pipe connections and to provide a threaded joint that combines high strength with excellent sealing properties.

It is another object of the present invention to provide an improved oil field pipe connection wherein the pipe ends are formed in a complementary sealing configuration to provide a fluid-tight seal therebetween when the pipe ends are brought together into contacting relationship.

It is a further object of the present invention to provide an improved threaded pipe joint connection for oil field use wherein the assembly of the joint can be performed without causing the sealing surfaces to slide relative to one another during the joint tightening operation.

It is a still further object of the present invention to provide an improved pipe joint connection for oil field use wherein the sealing surfaces are provide directly on the ends of the adjacent pipe sections.

It is yet another object of the present invention to provide an improved threaded pipe joint connection for oil field use wherein an intermediate sealing ring is provided to engage with corresponding surfaces of each of the ends of the pipes to be joined in order to provide a fluid-tight seal therebetween.

Briefly stated, in connection with one aspect of the present invention, an improved threaded connection for oil and gas well pipe sections is provided using an internally threaded tubular connector to interconnect externally threaded pipe sections. One pipe section has an end terminating in a first sealing surface and has an external thread formed thereon, the thread having a first pitch. The second pipe section has an end that terminates in a second sealing surface complementary to that of the first sealing surface and is adapted for sealing engagement therewith when the pipe end sections are brought into contact. The second pipe second end includes an external thread having a second and different pitch, and the threads on each of the first and second pipe section ends are of the same hand when the ends are adjacent each other. The tubular connector is adapted to engage with the respective ends of the pipe sections and has first threads adjacent one end thereof that are engageable with and have the same pitch as the threads on the first pipe section end, and has separate second threads adjacent the other end that are engageable with and have the same pitch as the threads on the second pipe section end, each of the first and second threads of the connector having the same hand. When the first and second pipe sections are brought close to each other with their axes in substantial alignment and the threaded tubular connector is engaged with the corresponding ends of each of the pipe end sections, final tightening of the connection is accomplished by restraining the pipe sections from relative rotation while rotating the connector to cause axial displacement of both pipe ends in one direction at different rates so as to draw the pipe ends together axially, without relative sliding therebetween, until the cooperating sealing surfaces are in compressive engagement with each other.

In accordance with another aspect of the present invention, a method is disclosed for assembling a pipe joint wherein first and second pipe ends and an internally threaded tubular connector have the construction hereinabove described. One end of the connector is threadedly engaged with the end of one pipe by relative rotation in one direction so that the corresponding threads engage to a point axially spaced a predetermined distance from a position of complete engagement, and so that additional relative rotation therebetween in the one engaging direction can be subsequently effected. Thereafter, the end of the second pipe is threadedly engaged with the other end of the coupling by relative rotation in the other direction so that the corresponding threads engage to a point approaches complete engagement. Each of the pipes is then restrained from relative rotation and while they are so restrained the connector is rotated to effect its axial displacement by the predetermined distance aforementioned to draw the pipe ends together axially so that the complementary end sealing surfaces of the pipes are brought into compressive sealing engagement without relative sliding therebetween.

BRIEF DESCRIPTION OF THE DRAWINGS

FIG. 3 is a fragmentary cross-sectional view showing a completed pipe joint incorporating a sealing ring that is received in and engages with each of the respective pipe ends.

FIG. 4 is a fragmentary cross-sectional view of a completed pipe joint defined by pipes having interengaging sealing surfaces at the pipe ends to provide a fluid-tight seal.

FIG. 5 is a fragmentary cross-sectional view similar to FIG. 4 but showing another embodiment for the interengaging sealing surfaces of the respective pipe ends.

FIG. 6 is a fragmentary view of a pipe connection in quarter section, wherein the respective pipe ends have interengaging end surfaces and include an internal sealing ring to provide an annular seal along the inner surfaces of each pipe adjacent its end.

FIG. 7 is an enlarged fragmentary side view showing the interengaging end surfaces of the respective pipe ends for the embodiment illustrated in FIG. 6.

FIG. 8 is a fragmentary view of a pipe connection, in quarter section, showing another form for the interengaging end surfaces of the respective pipes, and which includes an annular sealing ring carried on the inner surface of the tubular connector to engage with the outer surfaces of each of the pipe ends and on both sides of the joint therebetween.

FIG. 10 is a fragmentary view of another form of pipe connection, in quarter section, wherein the pipe ends do not contact each other, but include internal annular recesses to receive and engage an annular sealing ring therebetween.

DESCRIPTION OF THE PREFERRED EMBODIMENTS

Figure 2:
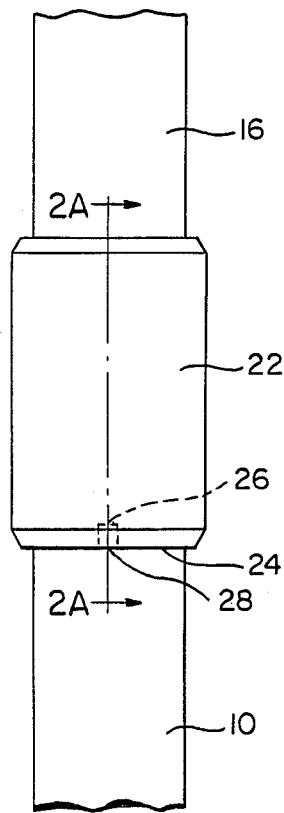
FIG. 2 is a view of the respective elements shown in FIG. 1 after the joint has been assembled and the pipe ends have been brought into engagement to effect a seal therebetween.
Figure 2A:
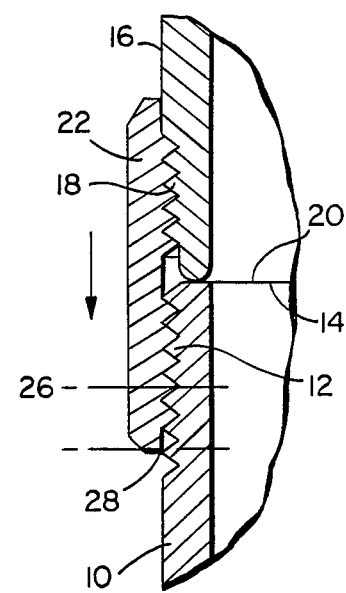
FIG. 2A is a section view taken substantially through a plane indicated by section line 2A—2A in FIG. 2.

Referring now to the drawings, and particularly to FIGS. 2 and 2A thereof, there is shown a pipe connection arrangement including a first pipe 10 having an externally threaded end 12 facing upwardly and terminating in a flat end wall to define a flat, annular sealing surface 14 that lies in a plane perpendicular to the axis of the pipe. A second pipe section 16 is similarly configured and includes an externally threaded end 18 that terminates in a complementary annular sealing surface 20 that faces downwardly and is adapted to engage with sealing surface 14 on first pipe 10 when the two pipe ends are brought into abutment. The respective external threads 12, 18 on each of the pipe ends are of the same hand when the pipe ends are opposite each other with their axes substantially coaxial, except that they are of a different pitch, which accounts for the establishment of a tight joint as will be explained hereinafter.

A tubular connector 22 is provided for engagement with the respective ends of each of the pipe sections 10, 16, and has separate internal threads as shown in FIG. 2A of the same hand. The internal threads adjacent one end of connector 22 are of a first pitch to engage with the corresponding external threads in first pipe section 10, and the internal threads at the opposite end of connector 22 are of a different pitch to correspond with the pitch of the external threads on second pipe 16. The difference in the pitches between the respective threads results either from a different number of threads per inch or by multiple threads, such as double or triple lead threads.

Figure 1:
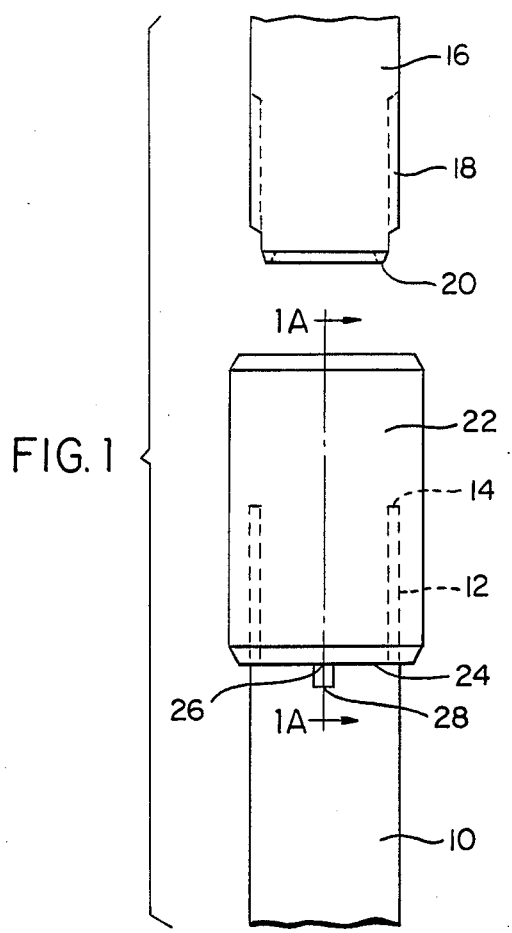
FIG. 1 is a fragmentary view showing a pair of spaced pipe ends, one of the pipe ends having a connector threaded thereto prior to assembly of the pipe ends to form a joint.
Figure 1A:
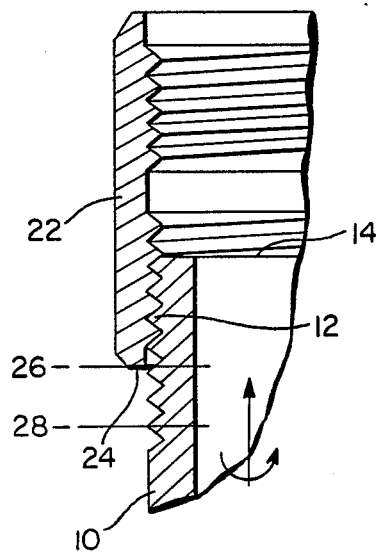
FIG. 1A is a partial section view taken substantially through a plane indicated by section 1A—1A in FIG. 1.
Figure 1B:
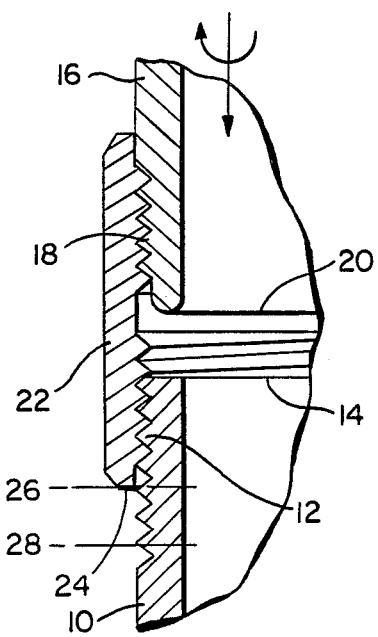
FIG. 1B is a partial section view corresponding to that of FIG. 1A, but showing another stage in the assembly of the pipe ends.

Connector 22 is first partially threadedly engaged with the upwardly extending end of first pipe section 10 to a point where the end face 24 of the connector is aligned with a first mark 26 on the outer surface of the first pipe section to provide the starting position for the connector, as shown in FIGS. 1 and 1a. Thereafter, second pipe section 16 is then elevated so that it is above the connector and substantially coaxial therewith, and is then lowered so that threaded end 18 can be rotated therewith and thereby screwed into the opposite, upwardly extending end of the connector 22 until the sealing surfaces 14, 20 of the respective pipe section ends either just barely make contact, or are spaced from each other a small distance, on the order of a fraction of an inch or so as shown in FIG. 1B. At that point, first and second pipe sections 10, 16 are restrained from relative rotation by suitable clamping means, and while they are so held, connector 22 is rotated relative to the pipe sections causing its axial movement relative to both restrained pipe sections because the meshing threads on the respective pipe ends are of the same hand, as aforementioned, with all of the loaded flanks thereby facing the same axial direction. The end face 24 on the connector is thereby advanced toward a second mark 28, during which time the pipe ends are drawn together axially, by virtue of the different thread pitches, so that the cooperating contacting end sealing surfaces are brought into tight, sealing engagement to form a completed joint as illustrated in FIGS. 2 and 2A. In assembling the joint in this manner, the respective sealing surfaces only move axially toward each other during final tightening, and because the pipe sections 10, 16 are restrained from relative rotation, relative sliding movement between the respective sealing surfaces is prevented, thus eliminating galling or fretting of the sealing surfaces. The differing pitches of the threads cause the connector to move axially along the respective pipe ends at different rates, to effect such axial movement of the sealing surfaces towards each other and thereby draw the pipe ends together during rotation of the connector. The amount of relative axial movement in one direction between the connector and the pipe ends during one revolution of the connector is the difference between the pitches of the respective threads. After initial axial engagement of sealing surfaces 14, 20, continued rotation of connector 22 continues without thread backing to draw the pipe ends together axially until a predetermined resistance torque level is reached, and thereby puts the pipe ends in compression to provide a pressure-tight seal solely by axial forces on the sealing surfaces and without relative rotation or sliding movement therebetween.

If desired, an additional mark (not shown) can be provided on second pipe 16 to assist in identifying the point at which to terminate the rotation of the second pipe into connector 22 so that relative sliding between the respective sealing surfaces on the pipe ends is avoided.

The threads that are provided on the pipe ends and on the connector of the present invention can be of any particular type and profile desired. V-threads, Acme threads, square threads, round threads, buttress threads, or the like can be employed. Additionally, Dardelet threads can be provided to assist in self-locking of the threaded connection when sufficient torque is applied during the tightening operation. The Dardelet threads will further lock the connection when tension is applied to the joint as, for example, when a long pipe string is supported in a well bore, and the upper pipe joints are subjected to tension by virtue of the weight of the string below the joint being supported.

An alternative sealing arrangement between the respective pipe ends is illustrated in FIG. 3, wherein each of the end faces 30, 32 of the respective pipe sections 10, 16 includes an inwardly tapered annular recess 34, 36, respectively, having converging tapered side walls to define an annular recess having a generally trapezoidal cross section. An annular sealing ring 38 having opposed annular projections 40, 42 is engageable with annular recesses 34, 36, respectively, of the pipe sections, and is interposed between the pipe end faces 30, 32. The tapered side walls of each of annular recesses 34 and 36, as well as the corresponding cooperating surfaces of sealing ring 38, are disposed at an acute angle, relative to a line parallel to the axis of the pipe, and preferably an angle of about 23°. Upon tightening of the joint in the manner hereinabove described, the annular recesses in the respective pipe ends engage with the corresponding annular projections on the sealing ring to provide respective fluid-tight seals between the pipe ends and the ring. Because of the tapers on the respective sealing surfaces, tight seals are assured despite slight irregularities in orientation of the sealing surface of the pipe ends and the sealing ring. Preferably the sealing ring is of a somewhat softer material having a lower modulus of elasticity than that of the pipes in order to permit deflection of the ring and thereby facilitate engagement of the sealing surfaces and consequent tighter contact and sealing therebetween.

Another configuration for the abutting sealing surfaces that can be formed on the ends of the pipes is illustrated in FIG. 4. As therein shown, each of the ends of pipes 10, 16 has corresponding annular inclined first surfaces 44, 46 that are inclined relative to a transverse plane perpendicular to the pipe axis at angles of about 13° and about 15°, respectively, and extend from the inner surfaces of the respective pipes to a point approximately at the middle of the pipe wall to corresponding generally axially directed annular surfaces 48, 50. Surfaces 48 and 50 are preferably angularly configured so that there is a divergence angle therebetween of from about 1° to about 5°. The vertex of the divergence angle is positioned adjacent the outermost intersection point of surfaces 44 and 48. This arrangement provides for a double seal defined by two pairs of abutting sealing surfaces for improved leak tightness.

FIG. 5 illustrates still another form of pipe end junction having abutting sealing surfaces, the form illustrated including an annular projection 52 defined by tapered side walls 54, 56 extending from the end wall of first pipe 16, and having a generally trapezoidal cross section, and a correspondingly shaped annular recess formed in the end wall of second pipe 10. Again, a double seal is provided for improved leak tightness and is defined by two pairs of abutting sealing surfaces. The inclination of side walls 54, 56, of first pipe 16, and the corresponding cooperating surfaces of second pipe 10, is at an acute angle relative to a line parallel to the axis of the pipe, and preferably at an angle of about 23°.

In the FIG. 5 embodiment, there is also illustrated the use of Dardelet threads. The threads 58 associated with first pipe section 10 have a first pitch and the threads 60 associated with second pipe section 16 have a second pitch different from the pitch of the first threads in order to provide the relative axial movement of the pipe ends that is contemplated in the present invention when connector 22 is rotated as pipes 10 and 16 are restrained from relative rotation.

Another form of the present invention is illustrated in FIGS. 6 and 7, wherein the ends of respective pipe sections 10 and 16 have alternating teeth 62 and similarly configured recesses 64 between alternating teeth, and that cooperatively interengage and extend axially from the ends of the respective pipe sections 10, 16. This particular construction is especially desirable and suitable where the casing or pipe is subjected to torque, and because of the interengaging teeth the torque loads are absorbed by the interengaging teeth and are readily accommodated without danger of unthreading the joint or destroying the seal. Further, in this configuration, the seal between the pipe ends is effected by means of a metallic annular sealing ring 66, having spaced external annular recesses 68, 70 to receive flexible annular sealing rings 72, 74, respectively. The material from which the flexible sealing rings are made will depend upon the environment to which the connection will be exposed, and can be an elastomer such as Teflon (a tetrafluoroethylene fluorocarbon polymer manufactured by E. I. DuPont de Nemours and Co.) or a combination of Teflon and up to 25% molybdenum disulfide or glass fibers. Sealing rings 72, 74 engage with coaxial annular inner surfaces 76, 78 of pipe sections 10, 16, respectively. Ring 66 is received in an annular recess that is defined by the respective inner surfaces of the ends of the pipe sections, which are formed with inwardly extending shoulders 80, 82, respectively, to define lands forming the lower and upper surfaces, respectively, of the annular recess. Further, because of the interengagement of the respective teeth and recesses in this embodiment, alignment of the pipe sections and interengagement of the teeth and recesses when the pipe sections are drawn together axially is accomplished by means of alignment marks (not shown) on each of the pipe sections to permit proper alignment so that final tightening can be accomplished in such a way that the teeth 62 of one pipe end are received in the recesses 64 in the other pipe end.

Figure 9:
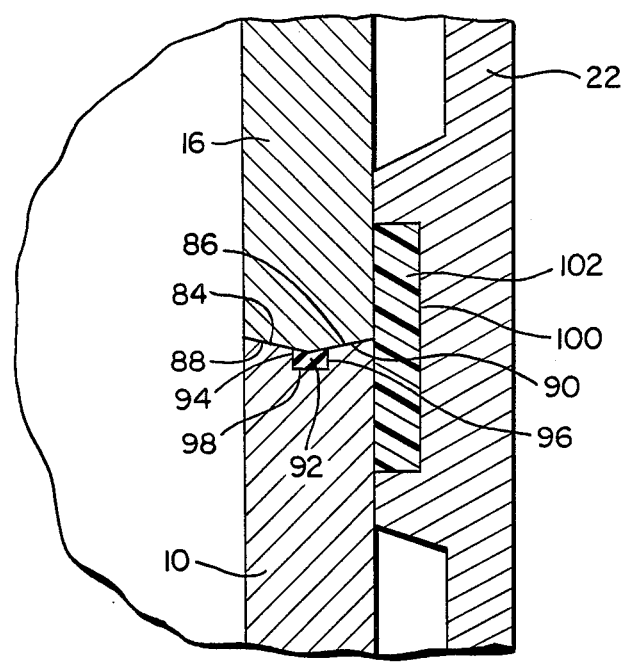
FIG. 9 is an enlarged fragmentary view of the interengaging sealing surfaces and annular seal in the embodiment illustrated in FIG. 8.

A still further embodiment of the present invention is illustrated in FIGS. 8 and 9, wherein pipe section 16 has an end surface in the form of a pair of inclined annular surfaces 84, 86 to define an annular projection having a generally triangular cross section, and pipe section 10 has a corresponding end surface in the form of a pair of inclined annular surfaces 88, 90 to define an annular recess having a generally triangular cross section. The latter recess also includes a further, generally rectangular annular recess 92 defined by axially directed side walls 94, 96 terminating in a bottom wall 98 and positioned opposite the apex of the respective triangular cross section of pipe section 16. The cooperating annular surfaces are inclined at an acute angle relative to a transverse plane perpendicular to the pipe axis, with surfaces 84 and 86 preferably at an angle of about 14° and surfaces 88 and 90 preferably at an angle of about 15°. When the ends of pipe sections 10 and 16 are brought into engagement by the rotation of connector 22, because of the differences in angular orientation of the respective annular surfaces, seals are first formed adjacent the inner and outer surfaces of the pipe sections. With further tightening of connector 22 the compressive forces generated between the pipe ends result in fluid-tight annular seals at the edges of recess 92 defined by the intersection of side walls 94, 96 and annular surfaces 88, 90, respectively. Additionally, connector 22 is provided with a generally rectangular annular recess 100 on its inner surface, which is adapted to receive a flexible annular sealing ring 102 of elastomeric material of a type similar to that of sealing rings 72, 74 disclosed in connection with the embodiment of FIGS. 6 and 7. Sealing ring 102 has a generally rectangular cross section and is positioned and has an axial extent sufficient so that it overlaps the exterior of the junction defined by the abutting pipe ends, to sealingly engage the outer surfaces of each of the pipe ends on each side of the junction.

FIG. 10 shows another embodiment of the present invention wherein the ends of each of the pipe sections 10, 16 include an undercut formed by an inner, inclined shoulder 104, 106, respectively, that together define a dovetail-type recess, when the ends are adjacent each other with the pipe sections coaxial, to receive an annular metal sealing ring 108 having a generally trapezoidal cross section with side walls that mate with and cooperatively engage with the undercuts of the corresponding walls of the pipe ends. As shown in FIG. 10, outermost surface 109 of ring 108 is of greater axial extent than is innermost surface 111 thereof. Additionally, although shown in its preferred form as being of generally trapezoidal cross section, sealing ring 108 can be rectangular, if desired, as can be the recess that is defined by the undercuts formed in the respective pipe end sections. The axial extent of sealing ring 108 is greater than the sum of the axial extents of the undercuts in the pipe ends so that the respective end faces 110, 112 of the pipe sections are spaced from each other when ring 108 is in position in order to permit some axial compression of ring 108 to assure a fluid-tight seal between the ring and the undercuts in the pipe sections. In this embodiment, an additional seal is provided at the annular outer surfaces 114, 116 of each of the pipe ends by sealing engagement therewith of an inwardly projecting annular sealing surface 118 defining a land on the inner wall of connector 22.

Figure 11:
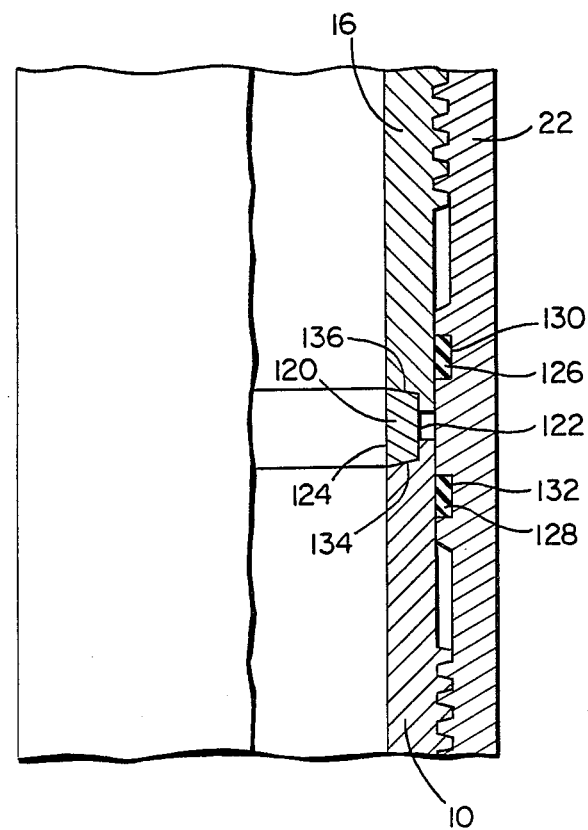
FIG. 11 is an enlarged fragmentary cross-sectional view of a connection similar to that illustrated in FIG. 10, and including a pair of spaced secondary seals carried on the interior surface of the connector and on opposite sides of the gap between the pipe ends.

FIG. 11 shows an embodiment that is structurally similar to that of FIG. 10, except that annular metal sealing ring 120 that provides the primary seal is of trapezoidal cross section and outermost surface 122 thereof is of lesser axial extent than is innermost surface 124. This embodiment also includes a pair of spaced, annular, elastomeric sealing rings 126, 128 to provide secondary seals, each of which is received in an inner annular recess 130, 132, respectively, formed in the inner surface of connector 22. Each of rings 126, 128 is positioned on opposite sides of the joint. In this embodiment, as a result of the orientation of axially inclined surfaces 134 and 136, in which those surfaces tend to converge at a point external of the joint, the compressive forces that result when pipe sections 10 and 16 are drawn together by virtue of rotation of connector 22 serve to cause outward bowing at the extremities of the respective pipe ends, and thereby cause tighter engagement between the seals 126, 128 and the cooperating annular outer surfaces of the ends of the respective pipes.

In the embodiments illustrated in FIGS. 10 and 11 the metallic sealing rings 108, 120, respectively, preferably have a modulus of elasticity that is less than that of the pipe sections to be joined, in order to permit some deflection of the sealing rings and thereby tighter contact and better sealing between the contacting surfaces of the sealing rings and the cooperating portions of the ends of the pipe sections. Additionally, the inclination of the side walls of sealing ring 108 that abut pipe end surfaces 104 and 109 of FIG. 10 is preferably about 15°, relative to a transverse plane perpendicular to the pipe axis, and the inclination of pipe end surfaces 104 and 106, relative to the same transverse plane, is preferably about 14°. Those angular relationships result in the formation of the seal commencing at the innermost surfaces of the pipes and the sealing ring as the respective elements are drawn together. Similarly, the angular relationships between the pipe end surfaces 134 and 136 of FIG. 11 and the corresponding surfaces of sealing ring 120 are such that the latter are about 15° and the former are about 14°.

Figure 13:
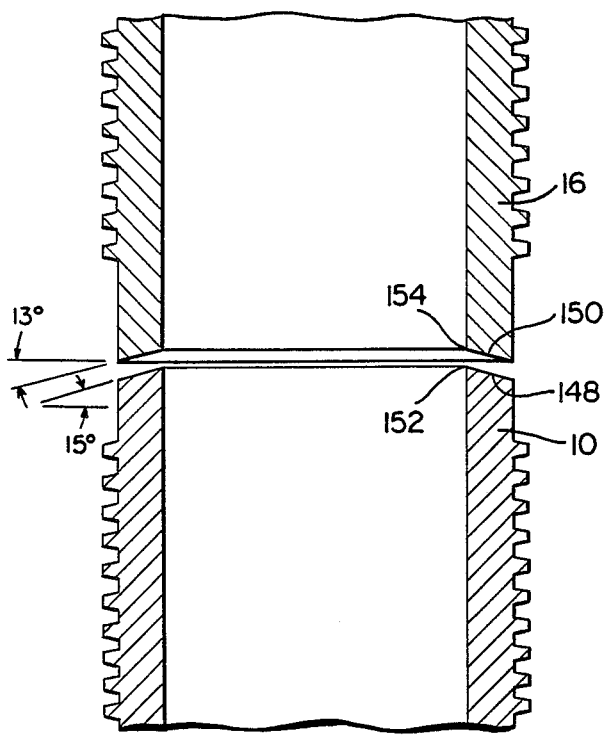
FIG. 13 is an enlarged fragmentary view of the structure illustrated in FIG. 12 showing the pipe ends spaced from each other.
Figure 12:
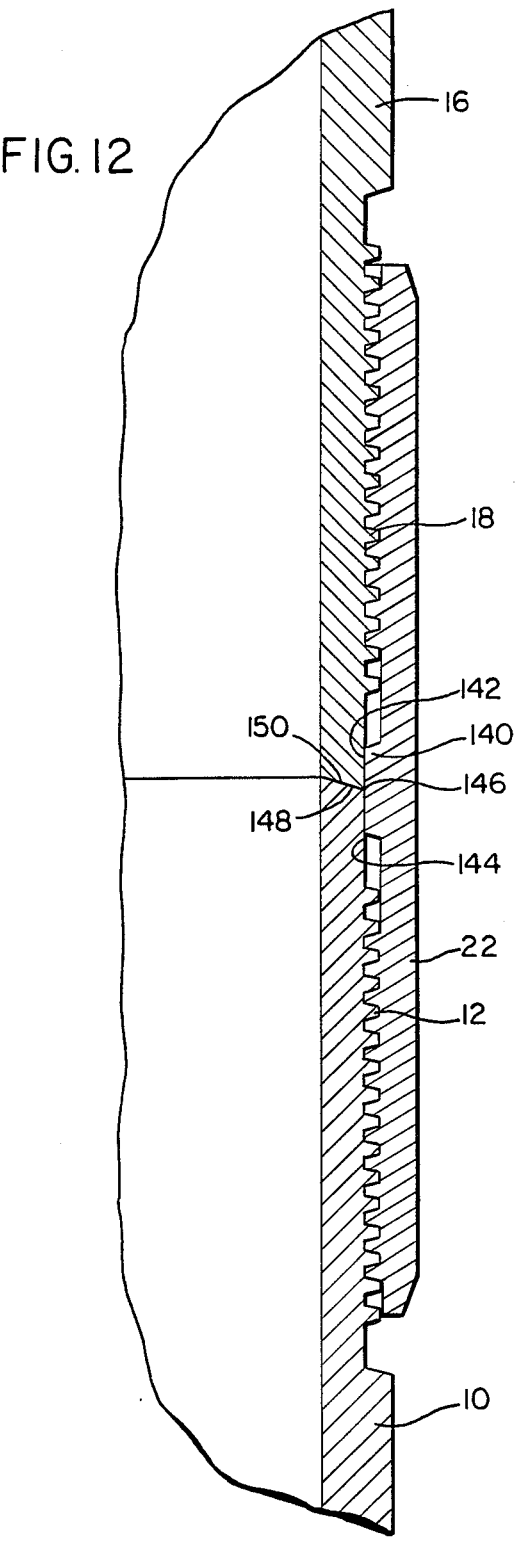
FIG. 12 is a fragmentary view of still another form of pipe connection, in quarter section, wherein the ends of the pipes include cooperating inclined annular sealing surfaces.

FIGS. 12 and 13 illustrate a further embodiment of the invention, wherein the pipe ends have angled end surfaces adapted for cooperative engagement to provide an annular seal therebetween. As clearly shown in FIG. 12, threads 18 on pipe section 16 have a larger pitch, and are therefore coarser, than threads 12 on pipe section 10, in order to provide the desired relative axial movement between the pipes when connector 22 is rotated while the pipe sections are restrained against relative rotation. Connector 22 also includes an inwardly projecting annular ridge 140 on the inner surface thereof that engages with each of the aligned, axially oriented sides 142, 144 of the pipes adjacent their exterior line of contact 146. As more readily seen in FIG. 13, inclined annular end surface 148 of pipe section 10 is inclined relative to the axis of the pipe. Similarly, annular end surface 150 of pipe section 16 is also inclined relative to the axis of the pipe, and the inclination of each of the end surfaces 148, 150 is such that they are obliquely positioned in the same orientation relative to the pipe axes when the pipe ends are coaxial and adjacent each other. As in the embodiments illustrated in FIGS. 4, 8, and 9, where the pipe ends come into contact with each other, and in FIGS. 10 and 11, where the pipe ends contact a sealing ring, it is desirable that the angles be slightly different, and preferably end surface 148 is at an angle of about 15°, relative to a transverse plane perpendicular to the pipe axis, while end surface 150 is at an angle of about 13°, relative to such a transverse plane. The effect of the difference in angles is to cause the pipe ends, or the pipe ends and the metallic annular sealing rings, depending upon the embodiment being considered, to first make contact at inner edges 152 and 154 when the ends are drawn together. Thus the resulting seal commences at the innermost part of the junction and progresses to the exterior of the junction as the axial pressure between the pipe ends increases by virtue of the continued rotation of connector 22 to draw the pipe ends together. The innermost surfaces of the joint are thus under higher compressive loads, and therefore under a higher compressive stress, than are the outer surfaces. As a result, the junction is more resistant to sulfide stress cracking and chloride stress cracking, as well as to erosion and to chemical attack by compounds such as hydrogen sulfide and carbon dioxide, which are compounds generally present in pipe strings used in oil and gas wells. Further, the tight contact of the innermost surfaces at the junction also provides a smooth interior surface that results in reduced turbulence as the fluid in the pipe flows past the junction. The angular difference between the cooperating pipe end sealing surfaces, and between the pipe ends and the metallic annular sealing rings, defines a divergence angle that is preferably from about 1° to about 5°.

Disassembly of the pipe joints of the present invention is the reverse of the assembly operation. The pipe sections are restrained against relative rotation while the connector is rotated in the opposite direction from the tightening direction, to release the compressive forces between the several elements of the seal, whereupon the elements can be readily separated from each other to complete the disassembly of the joint.

Although particular embodiments of the invention have been illustrated and described, it will be apparent to those skilled in the art that various changes and modifications can be made, and it is intended to encompass in the appended claims all such changes and modifications that fall within the scope of the present invention.

What is claimed is:

1. A threaded connection for oil and gas well pipe sections, said connection comprising: a first pipe section having an external thread formed thereon and having an end terminating in a first sealing surface, said thread having a first pitch; a second pipe section having an external thread formed thereon and having an end terminating in a second sealing surface for cooperative engagement with said first sealing surface and adapted for sealing engagement therewith, said second pipe section external thread having a second pitch different from the first pitch, said threads on each of said first and second pipe sections being of the same hand when said pipe ends are opposite each other; an internally threaded tubular connector adapted to engage with the respective threaded ends of said pipe sections, said connector having first threads adjacent one end thereof engagable with and having the same pitch as the threads on said first pipe section and having second threads adjacent the other end thereof engageable with and having the same pitch as the threads on said second pipe section, each of said first and second threads of said connector having the same; and said first and second pipe sections being threadedly engaged with the corresponding threads of said connector so that final tightening of the section can be accomplished by rotating the connector relative to the pipe sections and without relative rotation between the pipe sections, to draw the pipe ends together axially, without relative sliding between the respective sealing surfaces until the sealing surfaces are engaged under compressive stress, the pitch of said first thread being at least three times the pitch of said second thread.

2. A threaded connection for oil and gas well pipe sections, said connection comprising; a first pipe section having an external thread formed thereon and having an end terminating in a first sealing surface, said thread having a first pitch; a second pipe section having an external thread formed thereon and having an end terminating in a second sealing surface for cooperative engagement with said first sealing surface and adapted for sealing engagement therewith, said second pipe section external thread having a second pitch different from the first pitch, said threads on each of said first and second pipe sections being of the same hand when said pipe ends are opposite each other; an internally threaded tubular connector adapted to engage with the respective threaded ends of said pipe sections, said connector having first threads adjacent one and thereof engageable with and having the same pitch as the threads on said first pipe section and having second threads adjacent the other end thereof engageable with and having the same pitch as the threads on said second pipe section, each of said first and second threads of said connector having the same hand; and said first and second pipe sections being threadly engaged with the corresponding threads of said connector so that final tightening of the section can be accomplished by rotating the connector relative to the pipe sections and without relative rotation between the pipe sections, to draw the pipe ends together axially, without relative sliding between the respective sealing surfaces until the sealing surfaces are engaged under compressive stress, each of said pipe ends having a first sealing surface that is inclined relative to the axis of the connector and a second sealing surface that extends in a direction generally along the axis of the connection, the angles of inclination of said first sealing surfaces on said pipe ends being different from each other to define a divergent angle therebetween having its vertex innermost relative to the pipe axis, the difference between the angles of inclination of said inclined sealing surfaces being from 1° to 5°.

3. The threaded connection of claim 2 wherein said second sealing surfaces are at different angles relative to the axis of the pipe and define said divergence angle therebetween of from 1° to 5°.

4. A system for joining two pipe ends at axial end surfaces thereof, comprising a first pipe end having external thread means of a predetermined pitch, a second pipe end having external thread means of the same hand and a different pitch than said predetermined pitch, means responsive to compressive axial engagement between said end surfaces for sealing the pipe ends, coupling means having separate internal threads in fixedly spaced relation respectively matching said external thread means for sequential threaded engagement therewith prior to establishment of said compressive axial engagement and subsequent axial displacement in one direction at different rates with respect to the respective pipe ends and means for rotationally restraining the pipe ends to establish said compressive engagement between the end surfaces in response to simultaneous rotation of the internal threads by the coupling means relative to the pipe ends.

5. In combination,
  (a) upper and lower pipes and a tubular connector interconnecting said pipes so that the connector and the pipes extend in coaxial relation,
  (b) the upper pipe having an external thread, and the lower pipe having an external thread, the connector having upper and lower threads respectively meshing with the upper and lower external threads of the pipes,
  (c) the connector upper and lower threads respectively having first and second load flanks facing in the same axial direction, the first load flanks defining a first pitch and the second load flanks defining a second pitch, said pitches being different and characterized in that when the connector is rotated, the upper pipe endwise bottoms on the lower pipe and tightens endwise against the lower pipe, and
  (d) means restraining rotation of the pipes during said rotation of the connector for final endwise tightening between the pipes.

* * * * *